(12) United States Patent
Kugai

(10) Patent No.: US 6,272,238 B1
(45) Date of Patent: *Aug. 7, 2001

(54) CHARACTER RECOGNIZING METHOD AND APPARATUS

(75) Inventor: Masami Kugai, Yamato (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/717,679

(22) Filed: Sep. 23, 1996

Related U.S. Application Data

(63) Continuation of application No. 08/174,460, filed on Dec. 28, 1993, now abandoned.

(30) Foreign Application Priority Data

Dec. 28, 1992 (JP) .................................................... 4-348287
Nov. 30, 1993 (JP) .................................................... 5-299879

(51) Int. Cl.$^7$ .................................... G06K 9/00; G06K 9/46
(52) U.S. Cl. .......................... 382/165; 382/190; 382/224
(58) Field of Search ..................................... 382/190, 227, 382/228, 254, 216, 162–167, 209, 224, 309, 312; 358/470

(56) References Cited

U.S. PATENT DOCUMENTS

| | | | |
|---|---|---|---|
| 3,988,715 | * 10/1976 | Mullan et al. | 382/228 |
| 4,499,499 | * 2/1985 | Brickman et al. | 358/433 |
| 4,651,289 | * 3/1987 | Maeda et al. | 382/15 |
| 4,857,955 | * 8/1989 | Crandall | 395/109 |
| 4,944,022 | * 7/1990 | Yasujima et al. | 382/14 |
| 5,065,442 | 11/1991 | Kugai | 382/48 |
| 5,103,303 | * 4/1992 | Shoji et al. | 358/470 |
| 5,187,751 | * 2/1993 | Tanaka | 382/36 |
| 5,237,627 | * 8/1993 | Johnson et al. | 382/22 |
| 5,323,487 | * 6/1994 | Morita et al. | 395/115 |
| 5,825,905 | * 10/1998 | Kikuchi | 382/113 |

* cited by examiner

*Primary Examiner*—Bhavesh Mehta
(74) *Attorney, Agent, or Firm*—Fitzpatrick, Cella, Harper & Scinto

(57) ABSTRACT

Character recognizing method and apparatus for recognizing a character in an input document image and outputting the document as a recognition result by a visible image. The apparatus comprises a feature extracter for extracting a feature vector from an input character image, a recognition dictionary for storing a standard pattern of a character including font information, and an output unit for outputting a character code of the identified standard pattern and color information corresponding to the font kind. The dictionary stores the standard pattern every font.

20 Claims, 4 Drawing Sheets

CHARACTER RECOGNIZING METHOD AND APPARATUS

This application is a continuation of application Ser. No. 08/174,460 filed Dec. 28, 1993, now abandoned.

BACKGROUND OF THE INVENTION

1. Field of the Invention

The present invention relates to character recognizing method and apparatus for recognizing characters in a document image and outputting the document of the result of the recognition as a visible image.

2. Related Background Art

A conventional character recognizing apparatus absorbs a difference of features of patterns due to the kind of font of a character image as a target to be recognized and equally outputs one character code.

As an output of the recognition result in the conventional character recognizing apparatus, the recognition result of a document image is directly output by a character code irrespective of the kind of font and the same character of different fonts cannot be distinguished and output. When the document as a recognition result is output as a visible image, on the other hand, in order to output such a document as a color document, processes such that a target area or character is designated and a color is designated for the document must be repeated. Those designating processes must be performed to the document information as a recognition result.

SUMMARY OF THE INVENTION

According to the invention, since a desired color can be made correspond to the font information of the character which was recognized, a color document can be formed from an existing monochrome document. Particularly, as color copying machines and printers spread, it is required to form an easily understandable document by a color document. Even in case of an existing monochrome document, however, according to the invention, since a color document can be easily formed, information can be expressed in color.

According to the invention, the color when outputting a document as a result of recognition is determined in accordance with the kind of font of each character constructing a document as a target to be recognized, so that the operation to designate the color to an output document can be omitted. Even in a document processing apparatus which can print in only a monochrome color, an original as a base to form a color document can be formed.

DETAILED DESCRIPTION OF THE PREFERRED EMBODIMENTS (Embodiment 1)

Figure 1:
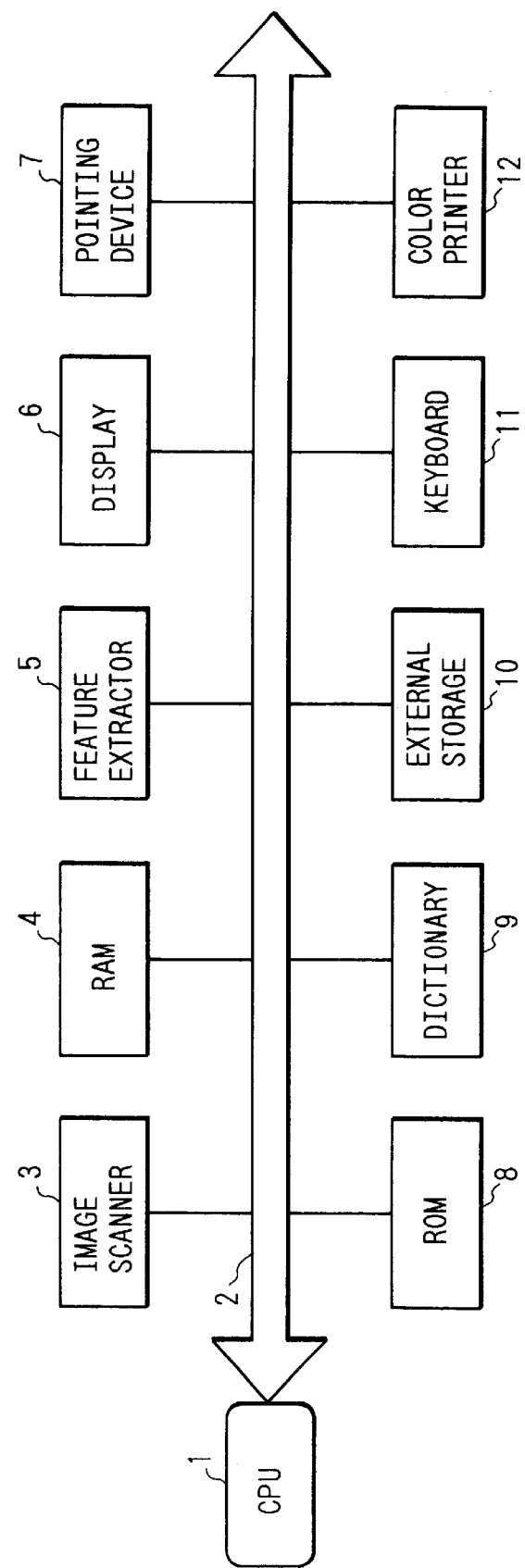
FIG. 1 is a block diagram showing a construction of a character recognizing apparatus in an embodiment.

FIG. 1 is a hardware block diagram showing a whole embodiment of the invention. In the diagram, reference numeral 1 denotes a CPU; 2 a bus; 3 an image scanner; 4 an RAM; 5 a feature extractor; 6 a display; 7 a pointing device; 8 an ROM to store a processing procedure in a flowchart, which will be explained hereinlater; 9 a dictionary; 10 an external storage; 11 a keyboard; and 12 a color printer.

Figure 2:
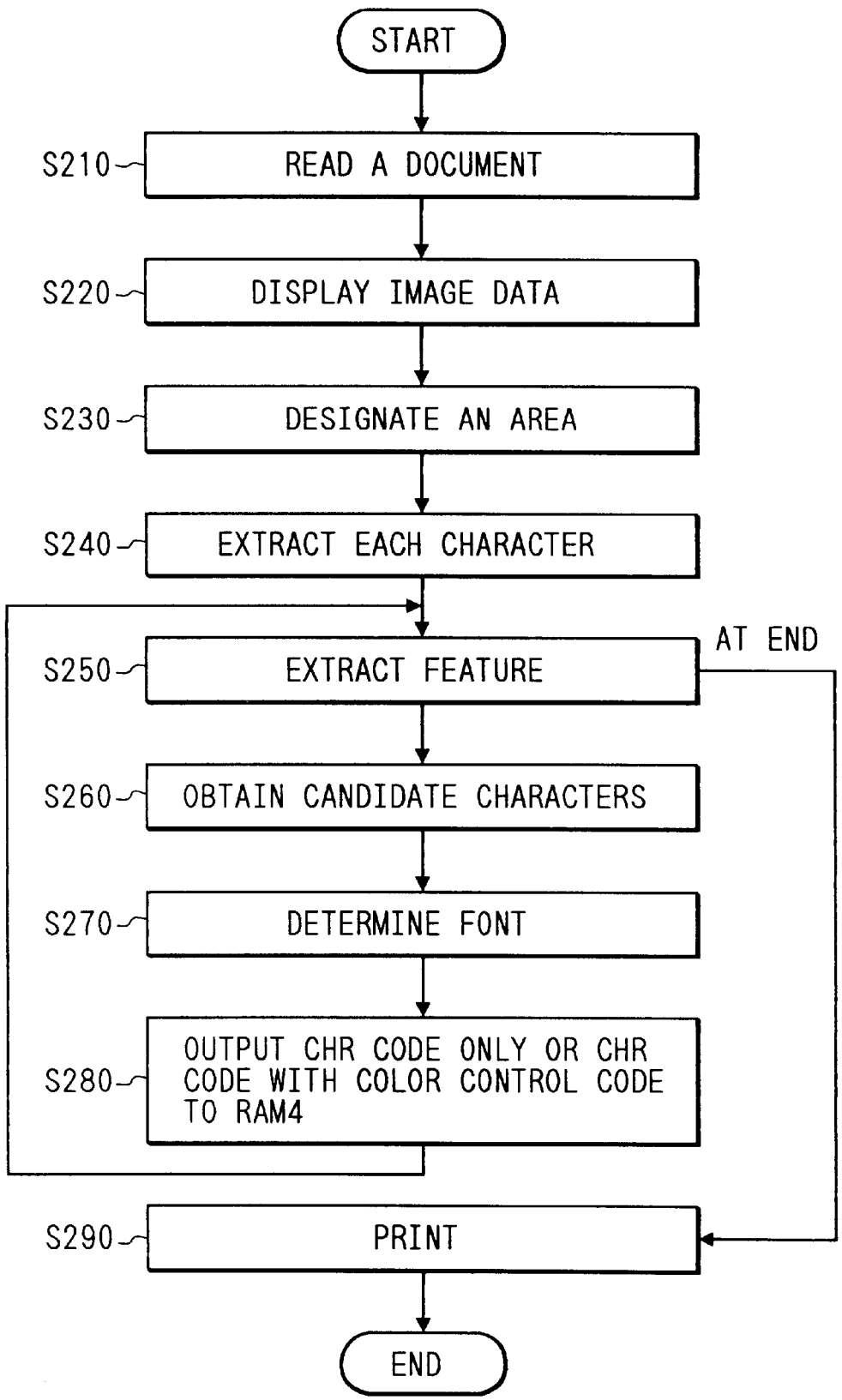
FIG. 2 is a flowchart for processes which are executed from the input of an image until the printing of a text.

FIG. 2 is a flowchart for explaining the operation of the embodiment. A control program according to the flowchart has previously been stored in the ROM 8 in FIG. 1.

The operation of the embodiment will now be described hereinbelow with reference to FIG. 2.

In step S210, a document is first read by the scanner 3 and stored as image data into the RAM 4.

The image data is displayed by the display 8 in step S220. In step S230, the image of a character portion as a target to be recognized is surrounded by the pointing device (hereinafter, referred to as a PD) 7, thereby designating an area.

In step S240, by projecting the black pixel in both of the lateral and vertical directions, the characters are extracted one by one from the image of the area designated in step S230.

In step S250, a weighting direction index histogram is extracted as a feature of a character pattern from each character image extracted in step S240 and sets it as a feature vector of 72 dimensions.

The dictionary 9 includes two portions such as first recognition dictionary and second recognition dictionary. The first dictionary is formed by learning characters of the Ming-style type. The second dictionary is formed by learning characters of the Gothic-style type. A correspondence table of a standard pattern, a character code, and a font code (0 indicates the Ming-style type; 1 indicates the Gothic-style type) has been stored in each of the first and second dictionaries and it includes standard patterns of the number as many as the number (for example, 3500) of characters as targets to be recognized.

In step S260, from the standard pattern of each of the first and second dictionaries in the recognition dictionary 9 and the feature vector extracted in step S250, the distances of both data are calculated by using a pseudo Bayes identifying method and are sorted in accordance with the order from the short distance (in accordance with the order from a high similarity). The candidate character of the first similarity is selected from each dictionary.

The above sorting process is executed for each of the first and second dictionaries and two kinds of candidate characters are obtained. The result of the calculation of the distance based on the pseudo Bayes identifying method is also obtained in correspondence to each candidate character.

In step S270, the results of the calculations of the two kinds of candidate characters obtained from the first and second dictionaries in step S260 are compared. The candidate character of a smaller difference (result of the calculation of the distance) is selected. The font of either one of the Ming-style type and the Gothic-style type is judged in dependence on whether the selected candidate character has been obtained from which one of the first and second dictionaries.

In step S280, only the character code is output to the RAM 4 in case of the Ming-style type and both of the color control code (using ESC of the ASCII control character) and the character code are output to the RAM 4 in case of the Gothic-style type. After that, the processing routine is returned to step S250.

In step S250, when all of the character images extracted in step S240 have been recognized in steps S250 to S280 and there is no character to be recognized, the processing routine advances to step S290. In step S290, all of the character codes and color control codes stored in the RAM 4 are input to the color printer 12. The character code in which no color control code exists just before is printed in black. The character code having the color control code just before is printed in red.

Until now, the printer has controlled whether the character code is printed in black or red in accordance with the presence or absence of the color control code existing just before. However, it is also possible to construct in a manner such that the printer controls the print color in accordance with the color mode. Namely, there are two kinds of color modes of black and red and the color control code indicates the switching of the color mode to the printer. It is also possible to construct such that the printer prints in black when the color mode is the black mode and prints in red when the color mode is the red mode.

The printer is initially set in the black mode. When a Gothic-style type appears in the character recognizing process, the color control code is output to the RAM 4. When the font is changed from the preceding font after that, the color control code is output to the RAM 4.

After completion of the recognition of all of the characters, the character code and color control code in the RAM 4 are output to the printer and are printed.

Even in the case where the number of kinds of colors which can be printed by the printer is equal to n (n≧3) and the number of kinds of fonts included in the character image as a target to be recognized is also equal to n, by properly selectively using the n kinds of color control codes, the n kinds of color modes can be controlled.

The means for outputting the recognition result is not limited to the color printer but a similar effect is also obtained by another color display.

(Embodiment 2)

In the embodiment, the second method of identifying the font of the input character image will now be described. According to this method, there is no need to increase the number of dimensions of the feature vector or to make the identifying calculations complicated in order to identify a small difference of the features of the character patterns between different kinds of fonts.

A construction and recognizing process of the character recognizing apparatus and a main flow of the recognizing process in the embodiment are similar to those in the embodiment 1 and have already been described by using FIGS. 1 and 2.

The embodiment 2 differs from the foregoing embodiment 1 with respect to the processing steps S250 to S270 from the feature extraction of the character image to the font judgment. Therefore, those processing steps will now be described in detail.

Figure 3:
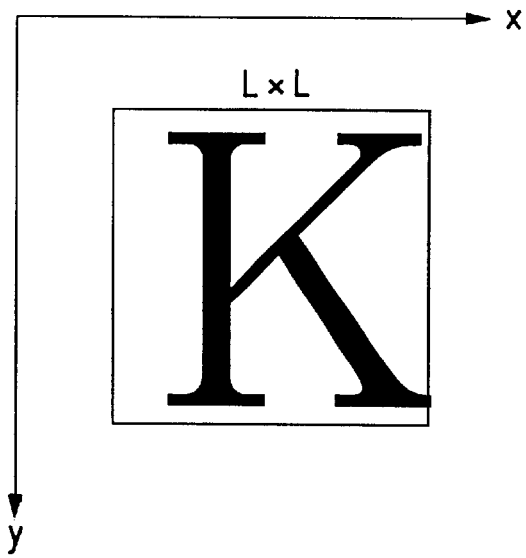
FIG. 3 is a diagram showing an unknown input character image.

FIG. 3 shows one character image extracted in step S240. In step S250, in order to make the size constant (normalize the size), a character image (L×L pixels) in FIG. 3 is converted into a character image of a size of 62 pixels×62 pixels. In this instance, the pixel values of the coordinates (x, y) of the normalized image are converted into the corresponding pixel values of the character image in FIG. 3 of the coordinates $(x_0, y_0)$ which are calculated by the following equations.

$$x_0 = \frac{L-1}{N-1}x + 0.5 \quad \text{(the figures below the decimal point are omitted)} \quad \text{(A-1)}$$

$$y_0 = \frac{L-1}{N-1}y + 0.5 \quad \text{(the figures below the decimal point are omitted)} \quad \text{(A-2)}$$

where, N=62

Figure 4:
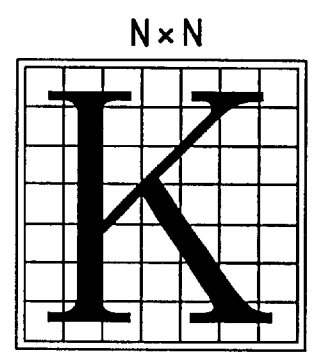
FIG. 4 is a diagram showing a normalized character image.

The outer frame of the white pixel (pixel value: 0) of one dot width is added to the further outside of the image of 62 pixels×62 pixels formed by the above processes, thereby setting the image of 64 pixels×64 pixels to the final normalized character image. The area of 63 pixels×63 pixels of 0≦x≦N and 0≦y≦N is divided into 49 (7×7) small lattice-like areas each comprising a small area of (9×9) pixels. FIG. 4 is a diagram showing a state in which the normalized image is divided into 49 small areas. The small area of the i-th row (i=0 to 6) in the x direction and the j-th column (j=0 to 6) in the y direction is expressed and designated by (i, j). It should be noted that the small areas existing on the row of i=6 and the small areas existing on the column of j=6 include the outer frame of the width of one dot of the white pixel.

Figure 6:
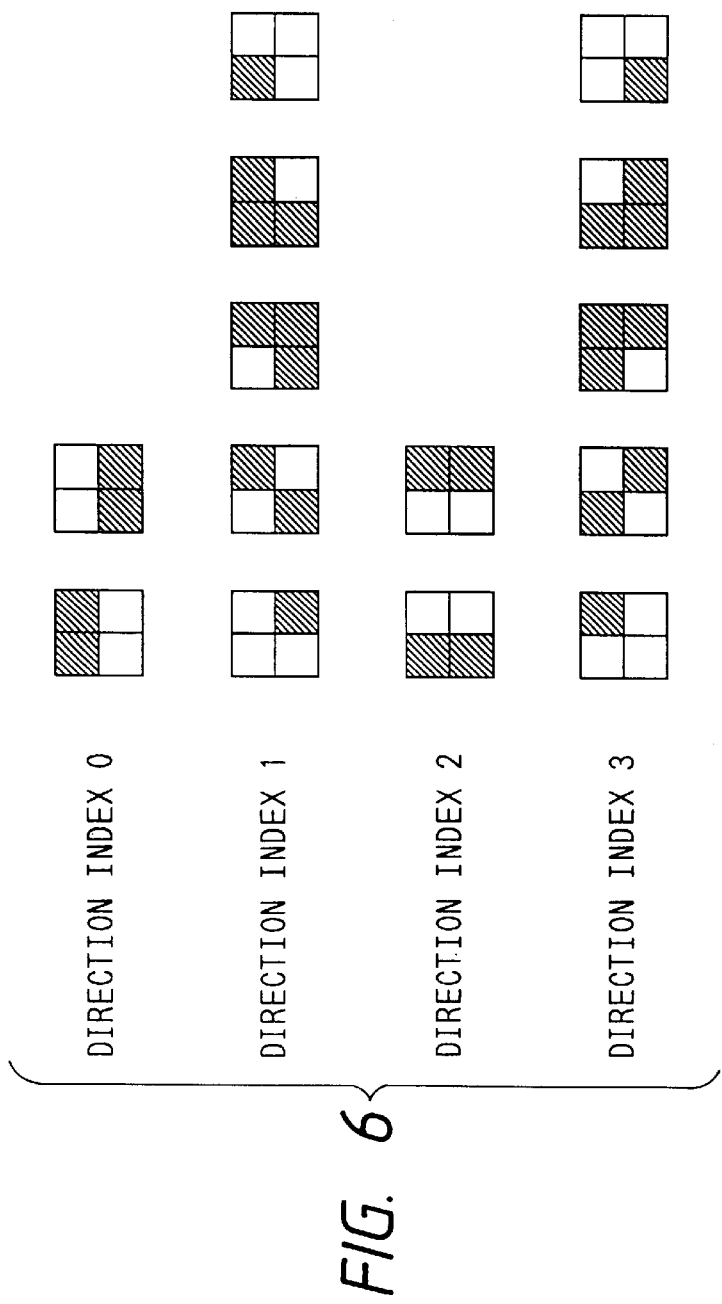
FIG. 6 is an explanatory diagram of a direction index.
Figure 7:
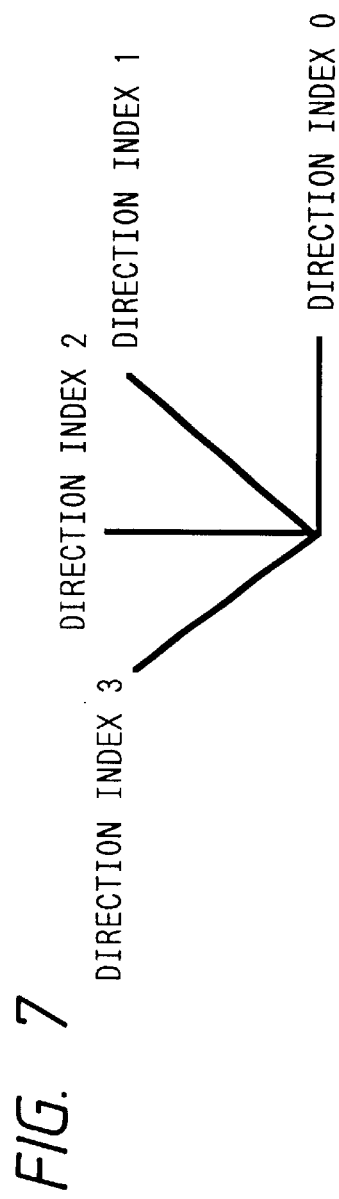
FIG. 7 is an explanatory diagram for the direction indicated by the direction index.

As a preparation, the image in which the whole area comprises the white pixels and the image in which the whole region comprises the black pixels are excluded from among the 16 kinds of images each comprising (2×2) pixels. The remaining 14 images are classified by a direction index in FIG. 6 and are made correspond to the direction indices k (k=0, 1, 2, 3). FIG. 7 shows four directions indicated by the direction indices.

Figure 5:
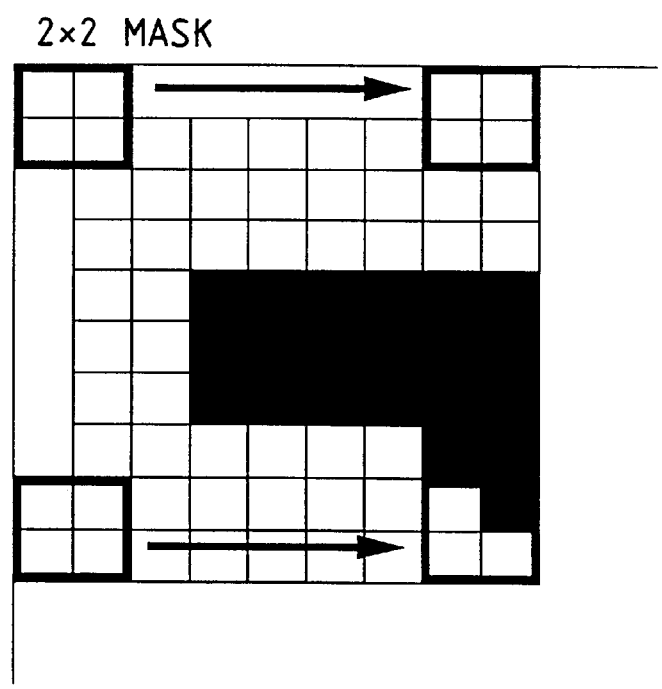
FIG. 5 is a diagram showing a partial small area in the character image.

A variable (direction index histogram) $H_{ij}(k)$ indicative how many numbers of direction indices in which the direction of the outline of the character image shows k exist in the small area (i, j) is obtained in the following manner. FIG. 5 shows the small area (1, 1). In case of the small area, a mask of (2×2) is raster scanned in the right lower direction in contact relation with the leftmost upper portion of the normalized image to which the outer frame of one dot width is added, thereby checking to which one of the direction indices in FIG. 6 the masked (2×2) images corresponds. Each time the corresponding direction index k is found out, $H_{ij}(k)$ is counted up. In this instance, the (2×2) image in which the whole region is constructed by the white pixel or black pixel is ignored. Such processes are executed with respect to the 81 (=9×9) (2×2) images in the small area. The above processes are executed with regard to each of the small areas, thereby obtaining the direction index histogram $H_{ij}(k)$ (i, j=0, 1, . . . , 6; k=0, 1, 2, 3).

Subsequently, among the 81 small areas, the small areas in which i and j are equal to even numbers (there are 4×4=16 small areas as such areas) are selected as representative small areas. To designate the representative small areas, they are expressed by (i', j') (i', j'=0, 1, 2, 3). Histograms of the representative small areas and their peripheral small areas are weighted and added, thereby obtaining new variables $h_{i'j'}(k)$ (i', j'=0, 1, 2, 3; k=0, 1, 2, 3).

$$h_{i'j'}(k) = \sum_{i,j \in G(i',j')} g_{ij} H_{ij}(k) \quad \text{(A-3)}$$

A set G(i', j') includes the representative small areas and their peripheral small areas. The peripheral small areas are eight small areas existing at the upper, lower, left, right, and oblique positions of the representative small area. A weight factor $g_{ij}$ is set to 4 in case of the representative small areas (i, j), 2 in case of the upper, lower, left, and right small areas (i, j), and 1 in case of the oblique small areas (i, j). Such a weight factor is analogous to a 2-dimensional Gaussian distribution function. However, in the case where the small areas (i, j) are undefined small areas, $g_{ij}=0$. A feature vector $x_i$ (i=1, 2, . . . , n) is obtained by properly one-dimensionally rearranging a 3-dimensional arrangement $h_{ij}(k)$. In this case, n=4×4×4=64.

A general method of forming a recognition dictionary in the pseudo Bayes identifying method will now be described hereinbelow. The recognition dictionary is a correspondence table among the character code, the character attributes, and the standard pattern and includes the information with respect to all of the character categories as targets to be recognized. The character attributes are information indicative of (1) a character kind (code indicative of the classification of an alphabetic character, numeral, Kanji, Hiragana, Katakana, symbol, and others), (2) font kind, (3) character size (distinction between the capital letter and the small letter, for example, distinction between the characters such as an alphabet "o" (which reads "oh") having two different letter sizes and the same character shape), and (4) a nature of the character. As a character code, it is possible to use an ASCII code of one byte in the case where the target character kind is only an alphabetic numerical character, symbol, or the like. In the case where the target character kind is Japanese, a JIS code of two bytes can be also used as a character code.

The standard pattern is formed as follows with regard to each character category. It is now assumed that the character category is expressed by v (which reads "new") (v=1, 2, . . . , L). The character category v is observed $n_s$ times (corresponding to the processes for reading by an image scanner and extracting as an image of one character) and a feature vector is obtained by the above method. The feature vector obtained by the α-th time is indicated by $vx_\alpha$. An observation mean vector $\overline{vx}$ of $n_s$ times is obtained by $$\overline{vx} = \frac{1}{n_s}\sum_{\alpha=1}^{n_s} vx_\alpha \quad \text{(B-1)}$$

When an arbitrary vector a is expressed by $$a = \begin{pmatrix} a_1 \\ a_2 \\ \vdots \\ a_n \end{pmatrix} \quad \text{(B-2)}$$

The transposed vector $a^t$ is $a^t=(a_1\ a_2\ -\ -\ -\ a_n)$.
When the following equation is defined, $$vV = \frac{1}{n_s}\sum_{\alpha=1}^{n_s}(vx_\alpha - \overline{vx})(vx_\alpha - \overline{vx})^t \quad \text{(B-3)}$$

vV is what is called a covariance matrix of n×n. A proper value and a proper vector are obtained for each matrix vV, the proper value is expressed by $v\lambda_i$ (i=1, 2, . . . , n), and the proper vector which belongs to $v\lambda_i$ is expressed by $v\Phi_i$ (i=1, 2, . . . , n). The proper values $v\lambda_i$ are arranged in accordance with the descending order of the value of i.

When the feature vector x of an unknown input character β is obtained, a probability P(x|v) in which the unknown input character β belongs to the character category v is given by $$P(x|v) = \frac{1}{(2\pi)^{n/2}|vV|^{1/2}}\exp\left\{-\frac{1}{2}(x-\overline{vx})vV^{-1}(x-\overline{vx})^t\right\} \quad \text{(B-4)}$$

The above equation is based on a rational assumption such that the unknown input vector x conforms with an n variable normal distribution. By setting vd(x)=−2 log P(x|v), $$vd(x) = \log(\lambda_1\lambda_2\ldots\lambda_n) + \sum_{i=1}^{n}\frac{(x-\overline{vx}, \overline{v\varphi_i})^2}{v\lambda_i} \quad \text{(B-5)}$$

where, (a, b) denotes the inner product of the vector. As the value of vd(x) is small, the probability such that the unknown input character belongs to the category character v is large, so that vd(x) is a difference function.

Such a function is called a pseudo Bayes identifying function.

Although $n_s$ learning characters are needed to obtain the proper value $v\lambda_i$ (i=1, 2, . . . , n) and the proper vector $v\Phi_i$ (i=1, 2, . . . , n) which belongs to $v\lambda_i$, since $n_s$ is a finite number, errors are included in the proper value $v\lambda_i$ and proper vector $v\Phi_i$. Particularly, since the absolute value of the high-degree term of the proper value is small, a precision is bad. Therefore, all of the proper values of i=k+1 degree and subsequent degrees are replaced to a predetermined value $v\Lambda$. As a parameter $v\Lambda$, for example, there is a method of equalizing those proper values to the proper value of $v\lambda_k$, a method of setting them to the mean value of all of the proper values of i=k+1 degree and subsequent degrees, or a method of setting them to another arbitrary value. On the other hand, the degree k (1≦k≦64) of the proper value of the highest degree which is not replaced to a predetermined value is set to, for instance, 10. By performing such a replacement, the above difference function is as follows.

$$vd(x) = \log(\lambda_1\lambda_2\ldots\lambda_{kv}\Lambda^{n-k}) + \sum_{i=1}^{k}\frac{(k-\overline{vx}, \overline{v\varphi_i})^2}{v\lambda_i} + \\ \frac{1}{v\Lambda}\left\{\|x-\overline{vx}\|^2 - \sum_{i=1}^{k}(x-\overline{vx}, \overline{v\varphi_i})^2\right\} \quad \text{(B-6)}$$

The standard pattern of the character category v is defined to a series of data comprising the average vector vx, proper value $v\lambda_i$ (i=1, 2, . . . , k), proper vector $v\Phi_i$ (i=1, 2, . . . , k), and parameter $v\Lambda$.

The standard pattern is previously obtained by the above method from an enough large number of learning characters (for instance, $n_s$=500) for the character category v (v=1, 2, . . . , L). The character code of the character category v and the character attributes are set to one group and a table in which the sets of (character code, character attributes, standard pattern) are sequentially arranged in accordance with the order of the character code is formed and used as a recognition dictionary. The standard patterns about L character categories are included in the recognition dictionary.

In the embodiment, two recognition dictionaries such as first and second dictionaries have been stored in the dictionary 9. In this case, although they are stored in one memory, they can be also stored into different memories.

The first dictionary is used for deciding the character category and is a table in which the character code of the character category v and the character attributes are set to one group with respect to each category and the sets of (character code, character attributes, standard pattern) are sequentially arranged in accordance with the order of the character code. As for the learning characters to form the standard pattern, an enough large number of sample characters of all of the recognition target fonts are included. A difference between the feature vector of the unknown character obtained in step S250 and the standard pattern of each character category in the first dictionary is calcuated by the equation (B-6). When differences of the number as many as the number L of character categories are obtained, the character categories are sorted in accordance with the ascending order of the differences. The character category which gives the minimum difference indicates the recognition result.

The font is recognized in step S270. A method of judgment and analysis of multi-class (class=font) is used to recognize the font. On the assumption that the character category (namely, character code) of the unknown character has been identified, it is necessary to recognize the next font. The number of fonts as targets to be recognized is now set to F. To discriminate which font (hereinafter, referred to as a class) the unknown font character (character in which the font is unknown although the character category has been identified) relates to, the method of judgment and analysis of the F class is used. Explanation will now be made hereinbelow.

Now, assuming that a matrix to convert the feature vector x of the unknown font character into a new feature vector y (m dimension: $m \leq n$) which is effective for the judgment is set to A (m×n), $$y = Ax \quad \text{(C-1)}$$

The average vector $x_i$ of the feature vector x of each class $c_i$ (i=1, ..., F) and the covariance matrix $\Sigma_i$ of the class $c_i$ is given by the following equation.

$$x_i = E_{Ci}[x] \quad \text{(C-2)}$$

$$\Sigma_i = E_{Ci}[(x-x_i)(x-x_i)^t] = E_{Ci}[xx^t] - x_i x_i^t \quad \text{(C-3)}$$

$E_{Ci}[\ldots]$ denotes an arithmetic mean of the class $c_i$. The average vector $x_i$ and the covariance matrix $\Sigma_i$ of the class $c_i$ can be obtained by an enough large number (for example, 500) of learning characters of the class $c_i$. A prior occurrence probability (probability indicating at which frequency a certain font occurs) of each class assumes $\omega_i$ and an intra-class covariance matrix $\Sigma_W$ can be defined as follows.

$$\Sigma_W = \sum_{i=1}^{F} \omega_i \Sigma_i, \quad \left(\sum_{i=1}^{F} \omega_i = 1\right) \quad \text{(C-4)}$$

The prior occurrence probability $\omega_i$ of each class can be obtained by previously statistically examining and obtaining the frequency at which each class (font) is used.

A inter-class covariance matrix $\Sigma_B$ is defined as follows.

$$\Sigma_B = \sum_{i=1}^{F} \omega_i (\overline{x_i} - \overline{x_T})(\overline{x_i} - \overline{x_T})^t \quad \text{(C-5)}$$

where, $x_T$ denotes an average vector of the feature vectors of the whole class C. By replacing "x" to "y" in the equations (C-4), (C-3), and (C-5) and an intra-class covariance matrix $\theta_W$ and an inter-class covariance matrix $\theta_B$ about the new feature vector y can be similarly defined. Thus, the following relation will be easily understood.

$$\theta_W = A\Sigma_W A^t, \quad \theta_B = A\Sigma_B A^t \quad \text{(C-6)}$$

Therefore, by setting $$J(A) = tr(\theta_W^{-1} \theta_B) \quad \text{(C-7)}$$

it is possible to perform the identification at a high precision by the new feature vector y so long as a transformation matrix A such as to maximize J(A) is obtained. Such a principle is shown by the judgment and analysis in the multi-class. It is sufficient to solve the following proper value problem by the equations (C-6) and (C-7).

$$\Sigma_W^{-1} \Sigma_B A = A\Lambda \quad \text{(C-8)}$$

where, $\Lambda$ is a matrix of m×m having the proper values $(\lambda_1 \geq \lambda_2 \ldots \geq \lambda_m)$ in which only the diagonal element is not equal to 0. Now, assuming that the normalized proper vectors which belong to $\lambda_i$ are set to $\phi_i$.

$$A = (\Phi_1 \Phi_2 \ldots \Phi_m)$$

The normalizing condition of the proper vector is as follows.

$$\Phi_i \Sigma_W \Phi_i^t = 1 (i=1, 2, \ldots, m) \quad \text{(C-9)}$$

The transformation matrix A of x→y is obtained by solving the proper value problem (C-8) from the learning data of each class by the equations (C-4) and (C-5).

As a second preparation, an average vector $\overline{y_i}$ of the new feature vector $y_i$, the proper value and proper vector of the covariance matrix (matrix in which x→y in the equation (B-3)), and the parameter $_i\Lambda$ are obtained from the learning data of each class.

As mentioned above, by previously obtaining the average vector $\overline{y_i}$ with respect to the transformation matrix A and new feature vector $y_i$, the proper value and proper vector of the covariance matrix, and parameter $_i\Lambda$, as for the font recognition after the character cateogy was identified, the decision of the font can be executed by the input unknown font and the pseudo Bayes identifying method in a manner similar to the case of determining the character category. The pseudo Bayes identifying method for deciding the font is written as follows.

$$vd(y) = \log(\lambda_1 \lambda_2 \ldots \lambda_{kv} \Lambda^{n-k}) + \sum_{i=1}^{k} \frac{(y - \overline{vy}, \overline{v\varphi_i})^2}{v\lambda_i} + \frac{1}{v\Lambda} \left\{ \|y - \overline{vy}\|^2 - \sum_{i=1}^{k} (y - \overline{vy}, \overline{v\varphi_i})^2 \right\} \quad \text{(C-10)}$$

where, v denotes an index to designate the class.

The transformation matrices A and character codes with respect to all of the character categories and the (F) standard font patterns about each font have been stored in the second dictionary so as to correspond to each other. The standard font pattern denotes the average vector $\overline{y_i}$ with respect to the new feature vector $y_i$, the proper value and proper vector of the covariance matrix, and the parameter $_i\Lambda$. It will be obviously understood that those statistic amounts are previously obtained by learning by using the character samples of the corresponding character categories and character fonts.

The new feature vector is obtained from the feature vector of the unknown character by the feature transformation matrix A and the difference between the new feature vector and the standard font pattern of each font is calculated by the equation (C-10). The font which gives the minimum difference is used as a recognition result. It should be noted that the feature transformation matrix A differs every character category.

In step S280, the character code and font code are output to the RAM 4. The color control code (using the ESC of the ASCII control character) and the color code corresponding to the font code are output to the RAM 4 and the processing routine is returned to step S250. When there is no character to be recognized in step S250, the processing routine advances to step S290. In step S290, the character code and color control codes stored in the RAM 4 are input and the character is printed in the color corresponding to the color code by the color printer 12.

In the embodiment, the pseudo Bayes identifying function has been used for both of the determination of the character category and the decision of the character font. However, in the second identification (decision of the character font), since the feature has already been converted into the effective new feature vector by the judgment and analysis, it is not always necessary to use the pseudo Bayes identifying function. Even if such an identification is executed by using a simpler Euclidean distance function, simple similarity, city block distance function, or the like, the precision is not so largely deteriorated. Therefore, a slight high processing speed can be expected.

Although the first dictionary has been formed by learning with respect to all of the fonts as targets to be recognized, there is a case where the shape of font especially large differs from another font. For example, Italic-style type in English can be mentioned as such a case. In this instance, it is difficult to learn all of the fonts by using only the first dictionary. Therefore, only special fonts (Italic-style types) are separately learned and the third recognition dictionary comprising only such fonts is previously formed. The above identification is executed between the unknown input character and each of the first and third dictionaries by the first identifying means. A difference 1 with the first dictionary and a difference 2 with the first dictionary are obtained. There is a method whereby the character category corresponding to either smaller one of the differences 1 and 2 is set to the recognition result and the character font is determined by the second identifying means. It will be obviously understood that there is no need to separately prepare the special fonts in case of the second dictionary.

What is claimed is:

1. A character recognizing apparatus comprising:

feature extracting means for extracting a feature from an input character image;

a recognition dictionary for storing a standard pattern of a character;

recognition means for recognizing a character and a type of font used therefor from said input character image by matching the feature extracted by said feature extracting means with the standard pattern stored in said recognition dictionary; and output control means for outputting the recognized character in a color corresponding to the type of font recognized by said recognition means.

2. An apparatus according to claim 1, wherein said recognition dictionary stores the standard pattern every font.

3. A character recognizing method comprising the steps of:

extracting a feature from an input character image;

recognizing a character and a type of font used therefor from said input character image by matching the feature extracted at said extracting step with a standard pattern stored in a recognition dictionary; and outputting the recognized character in a color corresponding to the type of font recognized at said recognizing step.

4. A method according to claim 3, wherein said recognition dictionary stores the standard pattern every font.

5. A character recognizing apparatus comprising:

feature extracting means for extracting a feature from an input character image;

a first recognition dictionary for storing a standard pattern of a first kind of font;

a second recognition dictionary for storing a standard pattern of a second kind of font;

recognition means for recognizing a character by matching the feature extracted by said feature extracting means with the standard pattern stored in said first recognition dictionary and said second recognition dictionary;

font identifying means for identifying one of said first and second recognition dictionaries which stores the recognized character based on the recognition result; and output control means for outputting the recognized character in a color corresponding to the identified type of font.

6. A character recognizing method comprising the steps of:

extracting a feature from an input character image;

recognizing a character by matching the feature extracted at said extracting step with a standard pattern stored in a first recognition dictionary for storing a standard pattern of a first kind of font and a second recognition dictionary for storing a standard pattern of a second kind of font;

identifying one of the first and second recognition dictionaries which stores the candidate character based on the recognition result; and outputting the recognized character in a color corresponding to the identified type of font.

7. An apparatus according to claim 1, wherein the character image is input from an image scanner.

8. An apparatus according to claim 1, further comprising a printer which prints a text in accordance with a character code output by said output means.

9. A method according to claim 3, wherein the character image is input from an image scanner.

10. A method according to claim 3, further comprising a printing step of printing a text in accordance with a character code output at said outputting step.

11. An apparatus according to claim 5, wherein the character image is input from an image scanner.

12. An apparatus according to claim 5, further comprising a printer which prints a text in accordance with a character code output by said output means.

13. A method according to claim 6, wherein the character image is input from an image scanner.

14. An apparatus according to claim 6, further comprising a printing step of printing a text in accordance with a character code output at said outputting step.

15. A computer-useable medium storing computer-useable instructions for causing a processor, in a character recognizing apparatus having a recognition dictionary for storing a standard pattern of a character, to perform character recognition, the instructions comprising instructions for:

(a) causing the processor to extract a feature from an input character image;

(b) causing the processor to recognize a character and a type of font used therefor from the input character image by matching the extracted feature with the standard pattern stored in the recognition dictionary; and (c) causing the processor to output the recognized character in a color corresponding to the type of font recognized at step (b).

16. A computer useable medium according to claim 15, wherein the character image is input from an image scanner.

17. A computer useable medium according to claim 15, further comprising instructions to cause the processor to control the apparatus to print a text in accordance with an output character code.

18. A computer-useable medium storing computer-useable instructions for causing a processor, in a character recognizing apparatus having a first recognition dictionary for storing a standard pattern of a first kind of font and a second recognition dictionary for storing a standard pattern of a second kind of font, to perform character recognition, the instructions comprising instructions for:

causing the processor to extract a feature from an input character image;

causing the processor to recognize a character by matching the extracted feature with the standard pattern stored in the first recognition dictionary and the second recognition dictionary;

causing the processor to identify one of the first and second recognition dictionaries which stores the recognized character based on the recognition result; and causing the processor to output the recognized character in a color corresponding to the identified type of font.

19. A computer useable medium according to claim 18, wherein the character image is input from an image scanner.

20. A computer useable medium according to claim 18, further comprising instructions to cause the processor to control the apparatus to print a text in accordance with an output character code.

\* \* \* \* \*